United States Patent
Hon et al.

(10) Patent No.: US 10,530,582 B2
(45) Date of Patent: Jan. 7, 2020

(54) METHOD AND DEVICE FOR INFORMATION SYSTEM ACCESS AUTHENTICATION

(71) Applicants: Singou Technology Ltd., Tortola (VG); Macau University of Science and Technology, Macao (CN)

(72) Inventors: Chi Tin Hon, Macao (CN); Chan Heng Tam, Macao (CN); Tai-Hua Ma, Macao (CN)

(73) Assignees: Singou Technology Ltd., Tortola (VG); Macau University of Science and Technology, Macau (CN)

( * ) Notice: Subject to any disclaimer, the term of this patent is extended or adjusted under 35 U.S.C. 154(b) by 335 days.

(21) Appl. No.: 15/032,182

(22) PCT Filed: Oct. 10, 2014

(86) PCT No.: PCT/CN2014/088271
§ 371 (c)(1),
(2) Date: Apr. 26, 2016

(87) PCT Pub. No.: WO2015/062398
PCT Pub. Date: May 7, 2015

(65) Prior Publication Data
US 2016/0269181 A1    Sep. 15, 2016

(30) Foreign Application Priority Data

Oct. 28, 2013 (CN) .......................... 2013 1 0518076

(51) Int. Cl.
*H04L 9/32*      (2006.01)
*H04L 29/06*     (2006.01)
(Continued)

(52) U.S. Cl.
CPC .......... *H04L 9/3228* (2013.01); *H04L 9/3226* (2013.01); *H04L 9/3249* (2013.01);
(Continued)

(58) Field of Classification Search
CPC ... H04L 9/3228; H04L 9/3226; H04L 9/3249; H04L 63/0414; H04L 63/0442;
(Continued)

(56) References Cited

U.S. PATENT DOCUMENTS 8,943,320 B2 *  1/2015  Sabin .................. H04W 4/00
                                                    713/171
9,276,921 B2 *  3/2016  Birkler ................ G06F 21/313
(Continued)

FOREIGN PATENT DOCUMENTS

| CN | 102202040 A | 9/2011 |
| CN | 102651739 A | 8/2012 |
| CN | 102957701 A | 3/2013 |

OTHER PUBLICATIONS

International Search Report for Application No. PCT/CN2014/088271 dated Jan. 16, 2015, 2 pages.
(Continued)

*Primary Examiner* — Saleh Najjar
*Assistant Examiner* — Louis C Teng
(74) *Attorney, Agent, or Firm* — Seyfarth Shaw LLP (57) ABSTRACT

A method and a device for information system access authentication are disclosed. The method includes: performing anonymous authentication to a random verification code generated according to a login request for accessing an information system of a client, and authenticating acquired user name and password information when the anonymous authentication is successful. The device includes an verification code authentication module and a user name and password authentication module connected to the verifica- (Continued)

tion code authentication module, wherein the verification code authentication module is configured to perform anonymous authentication to a random verification code generated according to a login request for accessing an information system of client; and the user name and password authentication module is configured to authenticate acquired user name and password information when the anonymous authentication is successful. The present disclosure uses a two-stage and two-factor authentication method such that the security of the login information is improved without increasing the complexity of the user's login.

6 Claims, 4 Drawing Sheets (51) Int. Cl.
*H04W 12/06* (2009.01)
*H04W 12/00* (2009.01)
(52) U.S. Cl.
CPC ...... *H04L 63/0414* (2013.01); *H04L 63/0442* (2013.01); *H04L 63/083* (2013.01); *H04W 12/06* (2013.01); *H04L 63/18* (2013.01); *H04L 2209/42* (2013.01); *H04L 2209/46* (2013.01); *H04W 12/00522* (2019.01)
(58) Field of Classification Search
CPC ... H04L 63/083; H04L 63/18; H04L 2209/42; H04L 2209/46; H04W 12/06
See application file for complete search history.

(56) References Cited

U.S. PATENT DOCUMENTS

| | | | | |
|---|---|---|---|---|
| 9,363,259 | B2* | 6/2016 | Chenna | H04L 63/0823 |
| 9,374,365 | B2* | 6/2016 | Jiang | H04L 67/08 |
| 2013/0111208 | A1* | 5/2013 | Sabin | H04W 4/00 |
| | | | | 713/171 |
| 2013/0179692 | A1 | 7/2013 | Tolba et al. | |
| 2013/0254858 | A1* | 9/2013 | Giardina | G06F 21/42 |
| | | | | 726/7 |
| 2014/0197232 | A1* | 7/2014 | Birkler | G06F 21/313 |
| | | | | 235/375 |
| 2014/0351589 | A1* | 11/2014 | Chenna | H04L 63/0823 |
| | | | | 713/168 |
| 2015/0156198 | A1* | 6/2015 | Sabin | H04W 4/00 |
| | | | | 713/176 |
| 2015/0178548 | A1* | 6/2015 | Abdallah | G06F 21/32 |
| | | | | 382/124 |
| 2016/0057123 | A1* | 2/2016 | Jiang | H04L 67/08 |
| | | | | 726/7 |
| 2018/0082050 | A1* | 3/2018 | Flink | G06F 21/32 |

OTHER PUBLICATIONS

Written Opinion for Application No. PCT/CN2014/088271 dated Jan. 16, 2015, 8 pages.

* cited by examiner

METHOD AND DEVICE FOR INFORMATION SYSTEM ACCESS AUTHENTICATION

CROSS REFERENCE TO RELATED APPLICATIONS

This is a National Stage application of PCT/CN2014/088271, filed Oct. 10, 2014, and further claims priority to Chinese patent application serial no. CN 201310518076.9, filed Oct. 28, 2013, the disclosures of which are incorporated herein by reference.

FIELD

The present disclosure relates generally to the field of information security technology, and more particularly, to a method and a device for information system access authentication.

BACKGROUND

Almost all the network information systems or internet information systems provide a login function that requires a user to be logged in to have access to acquire the service. The user login information is confidential. When a user logs in with a public computer or computer invaded by a Trojan horse, a computer virus or a computer worm, there is a serious risk of information disclosure. In addition, the user login information is vulnerable to phishing attacks that the login account may be stolen or hijacked.

The traditional network information systems or internet information systems implement the user login function by a login method including:

1. receiving a request for login from a user, and appearing a login interface of an information system on the client side;

2. receiving a user name and a password input by the user on the login interface, wherein some service providers provide a verification code on the login interface, in order to prevent dictionary and brute force attacks; and 3. creating, by the information system, a logon session for the user, when the login is successful, and returning, by the information system, an error message to the client side, when the login is unsuccessful.

The above login method, as a single-factor authentication, is too simple, and is easy for users to fall into phishing scams. With the above login method, the user name and password may be stolen when the client side is infected by a Trojan horse virus, so the above login method is low in security.

SUMMARY

In order to solve the above problems in the prior art, the present disclosure provides a method and device for information system access authentication, which can improve security without increasing the complexity of user login.

According to one aspect of the disclosure, a method for information access authentication is provided, including:

performing anonymous authentication to a random verification code generated according to a login request for accessing an information system of a client; and authenticating acquired user name and password information when the anonymous authentication is successful.

According to another aspect of the disclosure, a device for information system access authentication device is provided, including a verification code authentication module and a user name and password authentication module connected to the verification code authentication module. The verification code authentication module is configured to perform anonymous authentication to a random verification code generated according to a login request for accessing an information system of client; and the user name and password authentication module is configured to authenticate acquired user name and password information when the anonymous authentication is successful.

Compared with the prior art, the above method and device for information system access authentication have the following advantages. The user's login of the information system includes two stages: a first stage, including anonymous authentication, in which it is not required to provide the user name and password, and only the random verification code are acquired to be verified by a direct anonymous authentication method; and a second stage, including identifying information authentication, in which the user need to provide the user name and password for authentication. The authentication of two stages can effectively reduce the risk of the user login information leakage and improve security.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE PREFERRED EMBODIMENTS

Specific embodiments of the method for information system access authentication according to the present disclosure will be described in detail taken in conjunction with the accompanying drawings.

Figure 1:
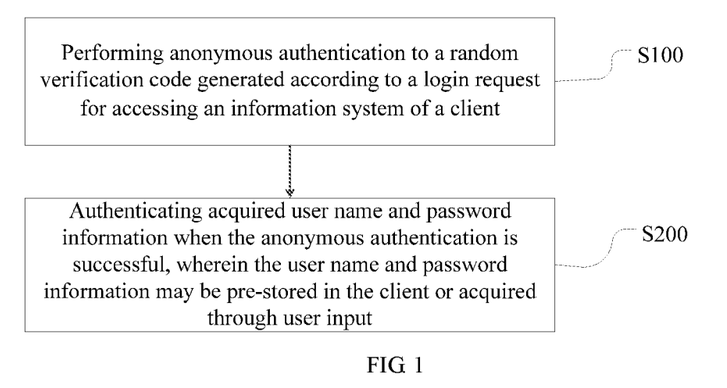
FIG. 1 is a flow diagram illustrating a method for information system access authentication according to one embodiment of the present disclosure.

As shown in FIG. 1, a method for information system access authentication is provided, including the following steps:

Step S100, performing anonymous authentication to a random verification code generated according to a login request for accessing an information system of a client.

The client may be a World Wide Web application client, namely Web browser client, or may be a client of the information system. The random verification code acts as Challenge information for anonymous authentication.

Step S200, authenticating acquired user name and password information when the anonymous authentication is successful, wherein the user name and password information may be pre-stored in the client or acquired through user input.

Figure 2:
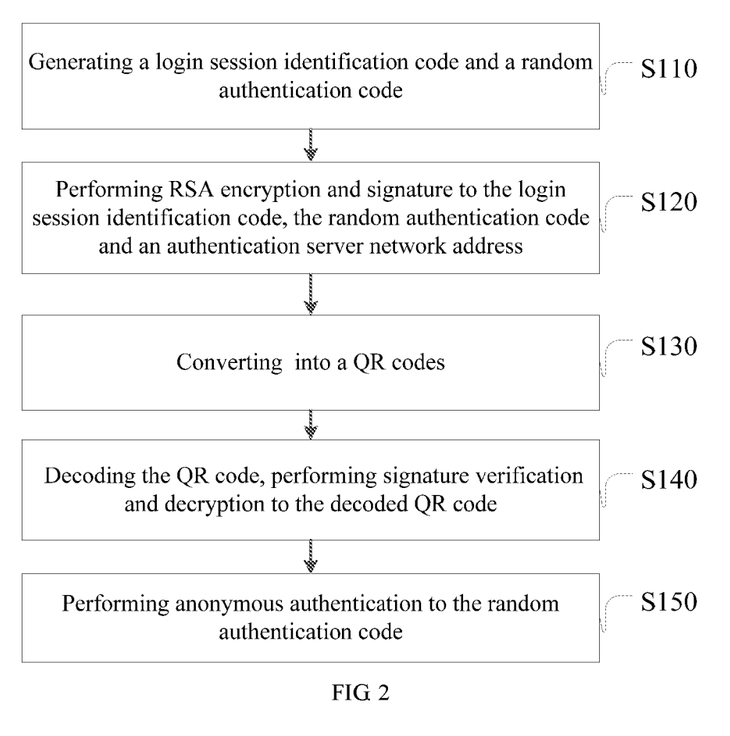
FIG. 2 is a flow diagram illustrating a process of performing anonymous authentication to a random verification code according to one embodiment of the present disclosure.

There are a variety of ways to implement the anonymous authentication to the random verification code in step S100, for example, in one embodiment, as shown in FIG. 2, the step S100 may include:

Step S110, generating a login session identification code and a random verification code according to a login request of the client for accessing the information system.

The login session identification code is temporary and unique, which facilitates to store based on entities and query and retrieve the entities one by one;

Step S120, performing RSA (asymmetric cryptographic algorithm) encryption and signature to the login session identification code, the random verification code and an authentication server network address with an information system private key and a user public key.

The authentication server may provide a function of registration of a client, that is, after an authentication application is installed in the client, the client should firstly be registered in the authentication server, and the client may create a link with the authentication server at any time through linking to the authentication server network address for authentication. The known techniques in the prior art can achieve the RSA encryption and signature, and the transmission of the authentication information is more secure and reliable when with the help of the asymmetric cryptographic technique.

Step S130, converting the encrypted and signed login session identification code, random verification code and authentication server network address into a QR (Quick Response) code. The known QR code conversion software or program in the prior art can achieve the QR code conversion. The transmission of the authentication information is more secure and reliable with the help of the asymmetric cryptographic technique.

Step S140, decoding the QR code, and performing signature verification and decryption to the decoded QR code with the information system public key and the user private key to obtain the login session identification code, the random verification code and authentication server network address.

The known method in the prior art can achieve the decoding of the QR code. For example, for a mobile phone with a camera in which an application of a QR code scanning function is installed, the QR code can be scanned for input with the assistance of an application in the prior art, to improve the user's operation experience. The known technology in the prior art can also achieve the signature authentication and decryption.

Step S150, performing anonymous authentication to the random verification code through linking to the authentication server network address.

The client may acquire the authentication server network address from the QR code, and the client may link to the authentication server through the authentication server network address, to verify the random verification code to authenticate that the user knows the QR code, and to provide an anonymous authentication which can authenticate the user belongs to trusted users of information system.

Figure 3:
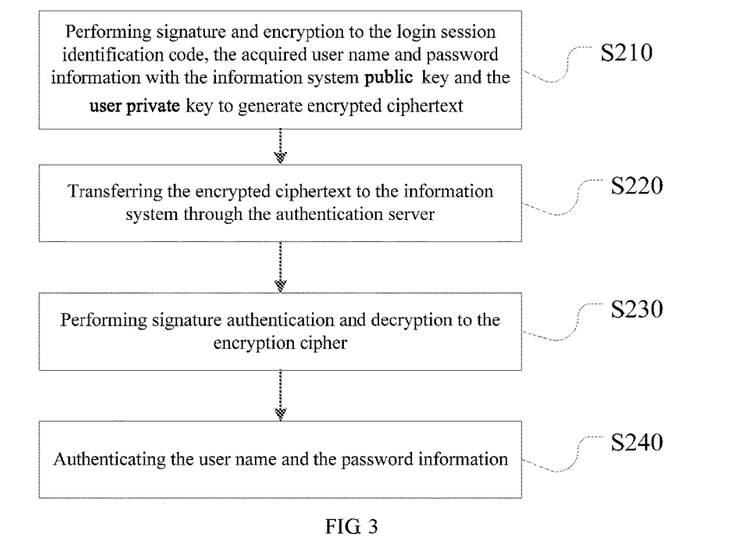
FIG. 3 is a flow diagram illustrating a process of authenticating information of a user name and a password according to one embodiment of the present disclosure.

There are a variety of ways to implement the authentication of the user name and password information in step S200, for example, in one embodiment, as shown in FIG. 3, the authentication of the user name and the password information in the step S200 may include:

Step S210, performing signature and encryption to the login session identification code, the acquired user name and password information with the information system public key and the user private key to generate encrypted ciphertext;

Step S220, transferring the encrypted ciphertext to the information system through the authentication server.

The client may link to the network address of the authentication server and transfer the encrypted ciphertext to the authentication server, then authentication server may transfer the encrypted ciphertext to the information system. The authentication server allows the user to provide login authentication function through the authentication server.

Step S230, performing signature authentication and decryption to the encryption cipher with the information system private key and the user public key to obtain the login session identification code, the user name and the password information.

Step S240, authenticating the user name and the password information, so that if the authentication is successful, the login of the information system access is completed.

In one embodiment, before step S110, it may further include acquiring a user login interface according to the login request for accessing.

After the step S130, it may further include displaying the QR code on the user login interface.

In order to facilitate to judge whether the anonymous authentication to the random verification code is successful, whether the second stage of authentication can be processed, whether the authentication to the user name and the password information in the second stage is successful and whether the login is successfully completed, in one embodiment, after the step S150, it may further include: returning a response message, determining, by the information system, whether the anonymous authentication is successful according to the response message, so that the information system informs the authentication server to perform the second stage of authentication when the anonymous authentication is successful, and no second stage of authentication is performed when anonymous authentication is unsuccessful.

After the step S240, it may further include: returning a successful login message when the authentication is successful, so that the user completes the login; and returning an error message when the password information mismatches with the user name or the user name or the password information is invalid, so that the user's login fails.

In one embodiment, the client may include a smart phone or a mobile terminal, in which an application having a function of QR code scanning and a property of network connection is installed. The application can scan the QR code, log in the authentication server and link the authentication server.

Based on the same invention concept, the present disclosure also provides a device for information system access authentication, the specific embodiments of which will be described in detail taken in conjunction with the accompanying drawings.

Figure 4:
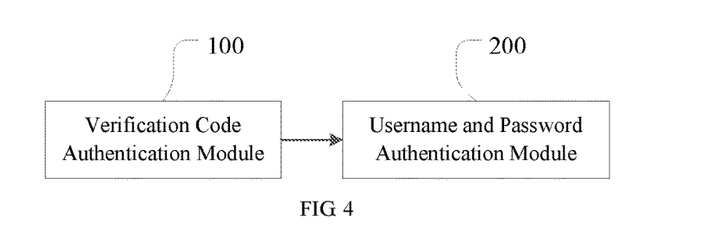
FIG. 4 is a schematic diagram illustrating a device for information system access authentication according to one embodiment of the present disclosure.

As shown in FIG. 4, a device for information system access authentication includes an verification code authentication module 100 and a user name and password authentication module 200 connected to the verification code authentication module 100. The verification code authentication module 100 is configured to perform anonymous authentication to a random verification code generated according to a login request for accessing an information system of client; and user name and password authentication module 200 is configured to authenticate acquired user name and password information when the anonymous authentication is successful.

Figure 5:
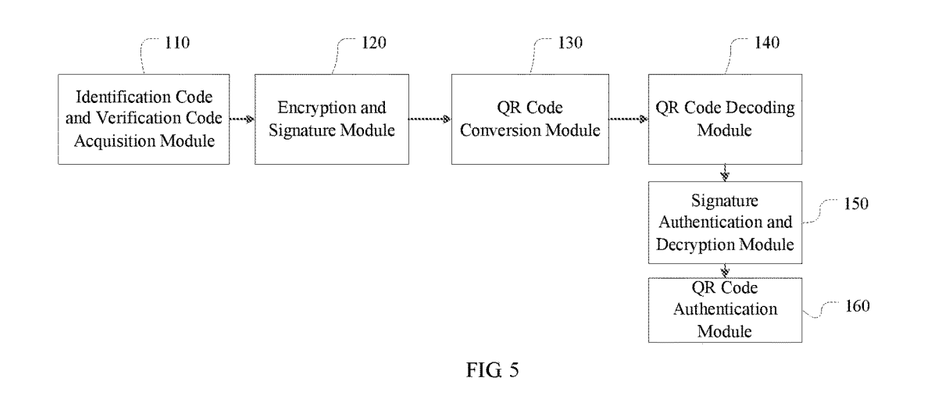
FIG. 5 is a schematic diagram illustrating a verification code authentication module according to one embodiment of the present disclosure.

There are a variety of ways for the verification code authentication module 100 to perform anonymous authentication to the random verification code, for example, in one embodiment, as shown in FIG. 5, the verification code authentication module 100 may include:

an identification code and verification code acquisition module 110, configured to generate a login session identification code and a random verification code according to a login request of the client for accessing the information system;

an encryption and signature module 120, configured to performing RSA encryption and signature to the login session identification code, the random verification code and an authentication server network address with an information system private key and a user public key;

a QR code conversion module 130, configured to convert the encrypted and signed login session identification code, random verification code and authentication server network address into a QR code;

a QR code decoding module 140, configured to decode the QR code;

a signature authentication and decryption module 150, configured to perform signature authentication and decryption to the decoded QR code with the information system public key and the user private key to obtain the login session identification code, the random verification code and authentication server network address; and a QR code authentication module 160, configured to link the authentication server network address to perform anonymous authentication to the random verification code.

Figure 6:
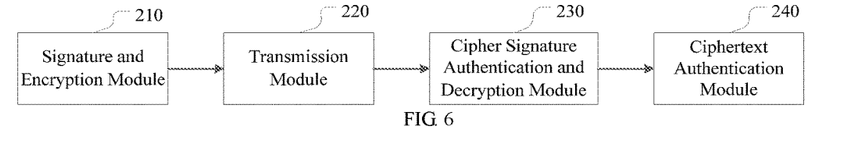
FIG. 6 is a schematic diagram illustrating a user name and password authentication module according to one embodiment of the present disclosure.

There are a variety of ways for the user name and password authentication module 200 to authenticate the user name and the password information, for example, in one embodiment, as shown in FIG. 6, the user name and password authentication module 200 may include:

a signature and encryption module 210, configured to perform signature and encryption to the login session identification code, the acquired user name and password information with the information system public key and the user private key to generate an encrypted ciphertext;

a transmission module 220, configured to transfer the encrypted ciphertext to the information system through the authentication server;

an encrypted ciphertext signature authentication and decryption module 230, configured to perform signature authentication and decryption to the encryption cipher with the information system private key and the user public key to obtain the login session identification code, the user name and the password information; and a ciphertext authentication module 240, configured to authenticate the user name and the password information, so that if the authentication is successful, the login of the information system access is completed.

In one embodiment, the device may further include a user login interface acquisition module and a QR code display module. The user login interface acquisition module is configured to acquire a user login interface according to the login request for accessing; and the QR code display module is configured to display the QR code.

The QR code display module may display the QR code on the user login interface after the QR code conversion module converting the encrypted and signed login session identification code, random verification code and authentication server network address into the QR code.

In order to facilitate to judge whether the anonymous authentication to the random verification code is successful, whether the second stage of authentication can be processed, whether the authentication to the user name and the password information in the second stage is successful and whether the login is successfully completed, in one embodiment, the QR code authentication module 160 is further configured to return a response message after performing anonymous authentication to the random verification code, and the information system may determine whether the anonymous authentication is successful according to the response message.

The cipher authentication module 240 is further configured to return a successful login message when the authentication is successful, and return an error message when the password information mismatches with the user name or the user name or the password information is invalid, after authenticating the user name and the password information.

In one embodiment, the client may include a smart phone or a mobile terminal.

Figure 7:
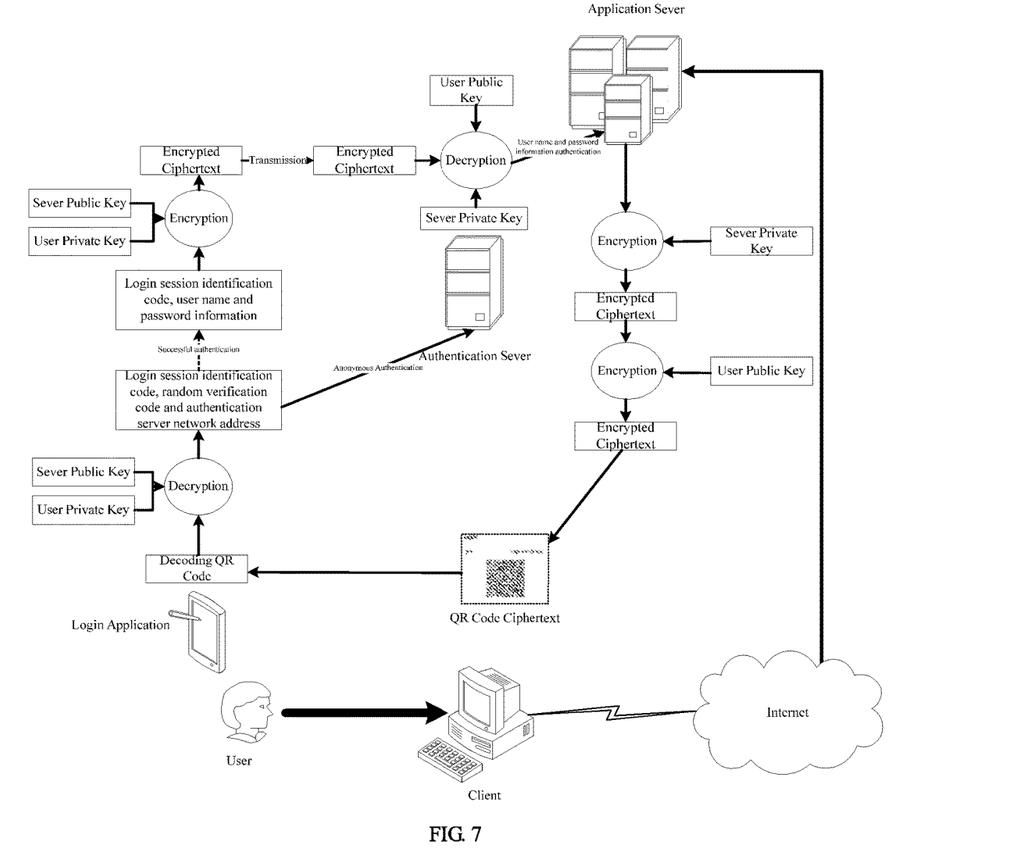
FIG. 7 is a flow diagram illustrating operational processes of a device for information system access authentication according to one embodiment of the present disclosure.

The concrete operational processes of the device may be best understood by reference to the following description taken in conjunction with an exemplary embodiment. As shown in FIG. 7, the application server is the information system of the present disclosure, and the login application has a function of QR code scanning and a property of network connection.

The client links the application server over the network, and sends a login request, and the application server returns a user login interface to the client;

the application server generates a login session identification code and a random verification code for the login request;

the application server performs RSA encryption and signature to the login session identification code, the random verification code and authentication server network address with the server private key and the user public key, to generate an encrypted ciphertext;

the application server converts the encrypted ciphertext into a QR code and display the QR code on the user login interface at the client;

the login application installed in the client scans the QR code through a camera device and decodes the QR code;

the login application decrypts the decoded QR code with the server public key and the user private key, to obtain the login session identification code, the random verification code and authentication server network address;

the login application links the authentication server to perform anonymous authentication to the random verification code, and the authentication server returns a response message;

the application server determines whether the anonymous authentication is successful according to the response message, and if the anonymous authentication is successful, the application server informs the authentication server to start the second stage of authentication;

the login application queries the user name and the password information stored in the client, and the user name and the password information can be also acquired by user input;

the login application performs encryption and signature to the login session identification code, the user name and the password information with the information system public key and the user private key to generate a new encrypted ciphertext;

the login application links the authentication server network address to transfer the new encrypted ciphertext to the authentication server;

the authentication server transfers the new encrypted ciphertext to the application server over the network;

the application server performs signature authentication and decryption to the new encrypted ciphertext with its own server private key and the user public key to obtain the login session identification code, the user name and password information; and the application server authenticates the user name and the password information, returns a successful login message when the authentication is successful and the login procedure is completed that the user's login is successful, and returns an error message when the authentication is unsuccessful.

Other technical features of the device are the same as the above method for information system access authentication, which need not be repeated here.

Compared with the prior art, the above method and device for information system access authentication has the following advantages.

1. The user's login of the information system includes two stages: a first stage, including anonymous authentication, in which it is not required to provide the user name and password, and it is only required to acquire the random verification code and verify the random verification code with a direct anonymous authentication method; and a second stage, including identifying information authentication, in which the user need to provide the user name and password for authentication. The authentication of two stages can effectively reduce the risk of the user login information leakage and improve security.

2. Two-factor authentication (i.e., QR code authentication and user name and password authentication) is required when a user logs in the information system, which combines the QR code technology and the asymmetric encryption technology to make the transmission of the authentication information more secure and reliable.

3. With the application software which facilitates the scanning of the QR code and the input of the password, the security is improved while the user's operation experience is also improved.

The embodiments are chosen and described in order to explain the principles of the disclosure and their practical application so as to activate those skilled in the art to utilize the disclosure and various embodiments, and are not intended to limit the scope of the present disclosure in any way. It would be understand by those skilled in the art that various changes and modifications can be made to the embodiments described herein without departing from the scope and spirit of the present disclosure. Accordingly, the scope of the present disclosure is defined by the appended claims rather than the foregoing description and the exemplary embodiments described therein.

The invention claimed is:

1. A method for information access authentication, comprising:

performing anonymous authentication to a random verification code generated according to a login request for accessing an information system of a client; and authenticating acquired user name and password information when the anonymous authentication is successful, wherein the step of performing anonymous authentication comprises:

generating a login session identification code and the random verification code according to the login request of the client for accessing the information system;

performing RSA encryption and generating a signature to the login session identification code, the random verification code, and an authentication server network address with an information system private key and a user public key;

converting the encrypted and signed login session identification code, random verification code, and authentication server network address into a QR code;

decoding the QR code and then performing signature authentication and decryption to the decoded QR code with an information system public key and a user private key to obtain the login session identification code, the random verification code and authentication server network address; and performing anonymous authentication to the random verification code through linking to the authentication server network address, and wherein the step of authenticating the acquired user name and the password information comprises:

signing and encrypting the login session identification code and the acquired user name and password information with the information system public key and the user private key to generate encrypted ciphertext;

transferring the encrypted ciphertext to the information system through the authentication server;

performing signature authentication and decryption to the encryption ciphertext with the information system private key and the user public key to obtain the login session identification code, the user name, and the password information; and authenticating the user name and the password information and then completing the login of the information system access if authentication is successful.

2. The method of claim 1, further comprising acquiring a user login interface according to the login request for accessing before generating the login session identification code and the random verification code according to a login request of the client for accessing the information system; and displaying the QR code on the user login interface after converting the encrypted and signed login session identification code, random verification code, and authentication server network address into the QR code.

3. The method of claim 1, wherein the client includes a smart phone or a mobile terminal.

4. A system for information system access authentication, comprising:

an application server configured to perform anonymous authentication to a random verification code generated according to a login request for accessing an information system of a client, wherein the application server is configured to:

(a) generate a login session identification code and the random verification code according to the login request of the client for accessing the information system;

(b) perform RSA encryption and generate a signature to the login session identification code, the random verification code, and an authentication server network address with an information system private key and a user public key;

(c) convert the encrypted and signed login session identification code, random verification code, and authentication server network address into a QR code;

(d) perform signature authentication and decryption to an encryption ciphertext with the information system private key and the user public key to obtain the login session identification code, a user name, and password information; and (e) authenticate the user name and the password information, and complete the login of the information system access if authentication is successful;

a login application operating on a client device and configured to authenticate the user name and the password information when the anonymous authentication is successful, wherein the login application is configured to:

(a) decode the QR code;

(b) perform signature authentication and decryption to the decoded QR code with an information system public key and a user private key to obtain the login session identification code, the random verification code, and authentication server network address;

(c) link the authentication server network address to perform anonymous authentication to the random verification code;

(d) sign and encrypt the login session identification code and the user name and password information with the information system public key and the user private key to generate the encrypted ciphertext; and (e) transfer the encrypted ciphertext to the information system through the authentication server.

5. The system of claim 4, wherein the application server is further configured to acquire a user login interface according to the login request for accessing, and cause display of the QR code on the user login interface.

6. The system of claim 4, wherein the client device includes a smart phone or a mobile terminal.

* * * * *